United States Patent Office 3,470,875
Patented Oct. 7, 1969

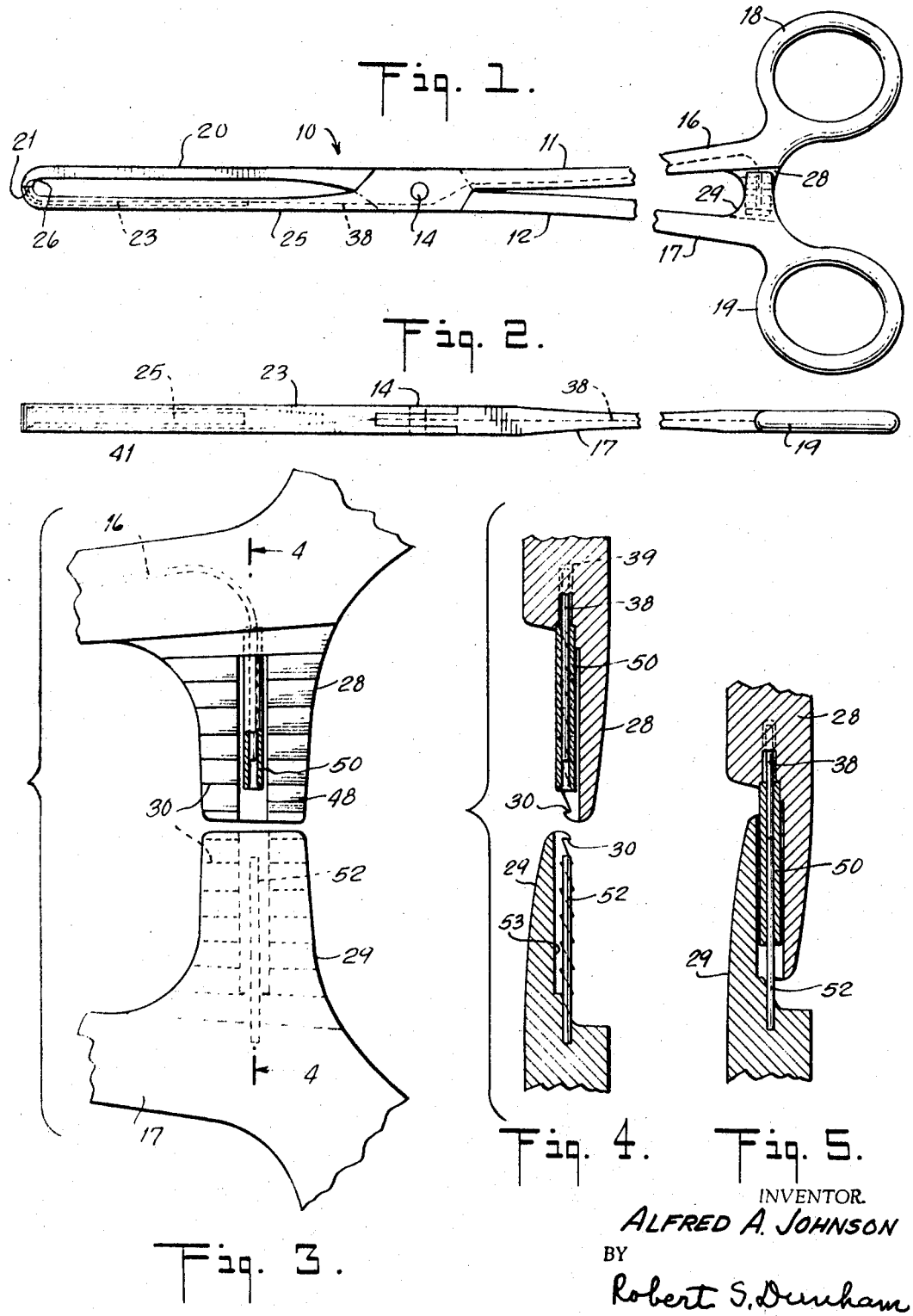

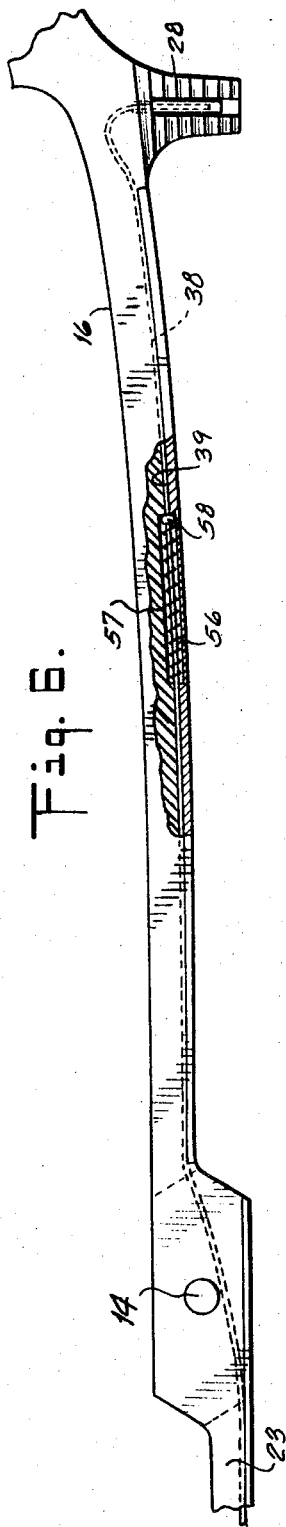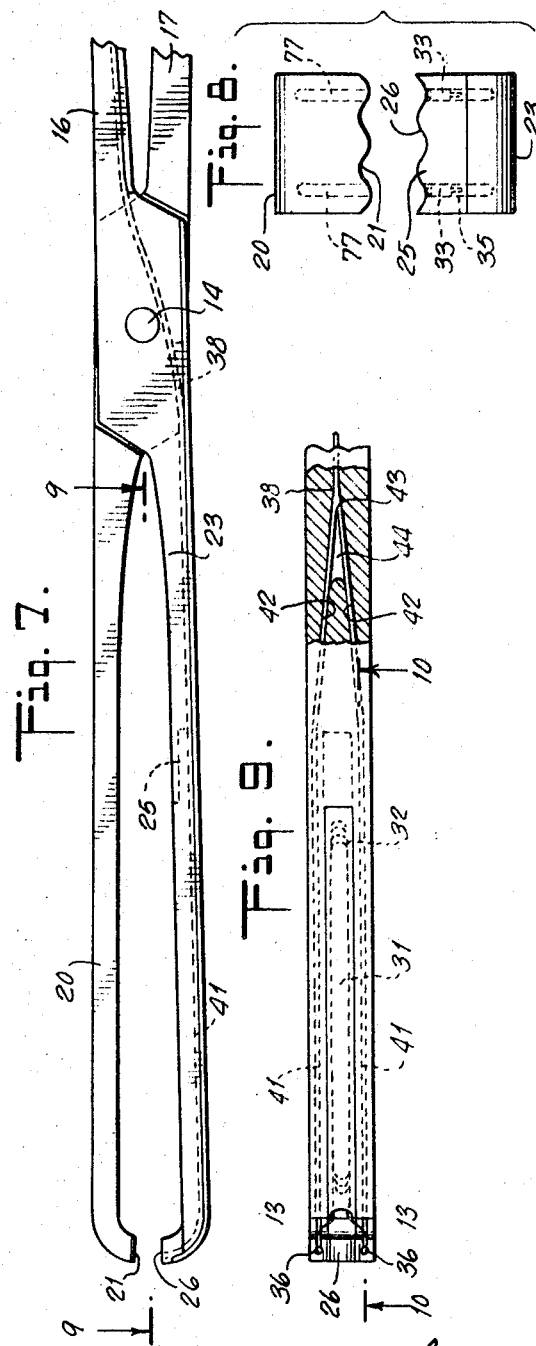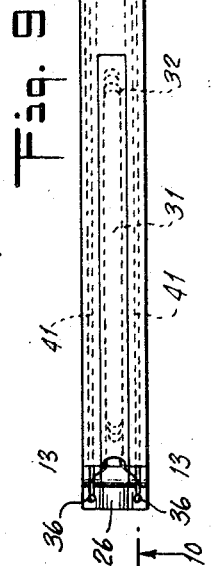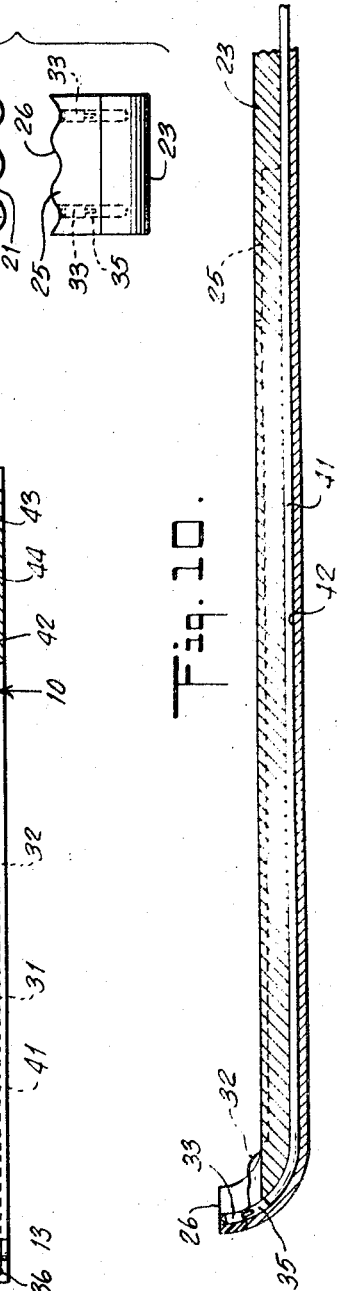

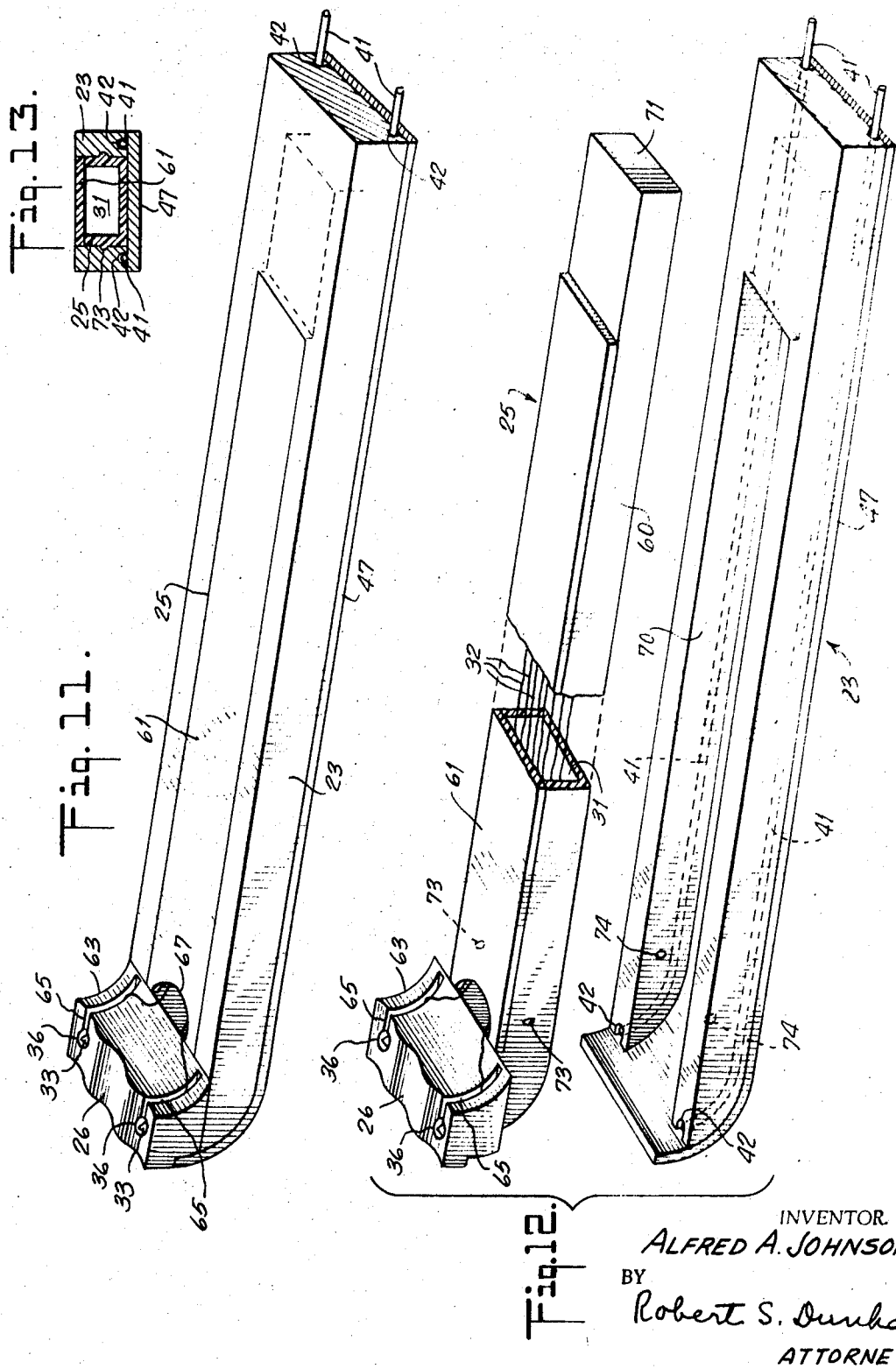

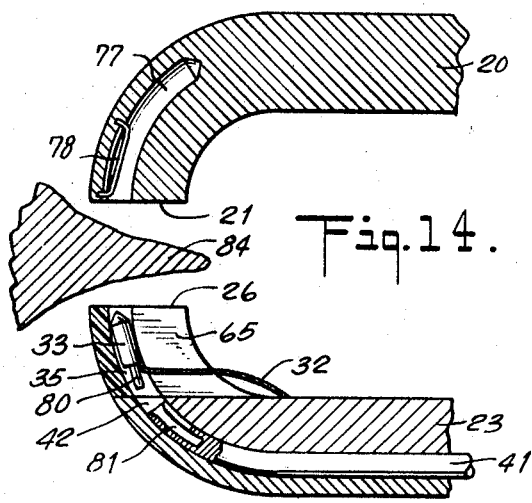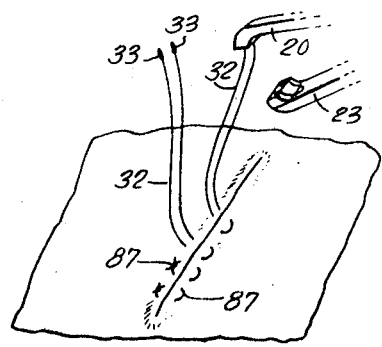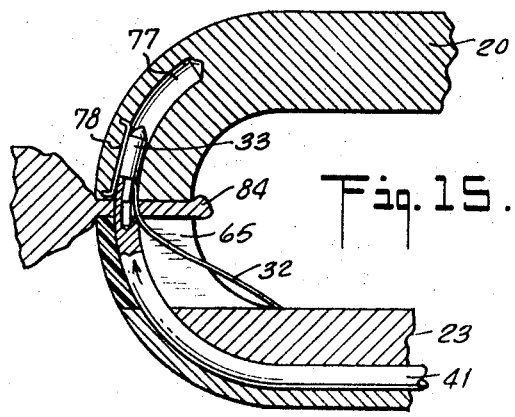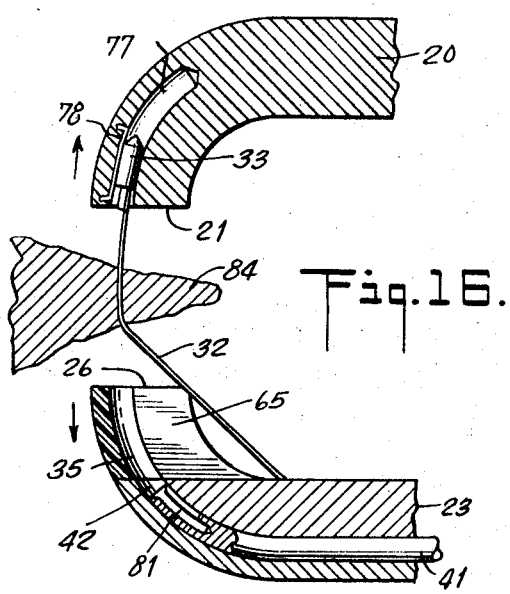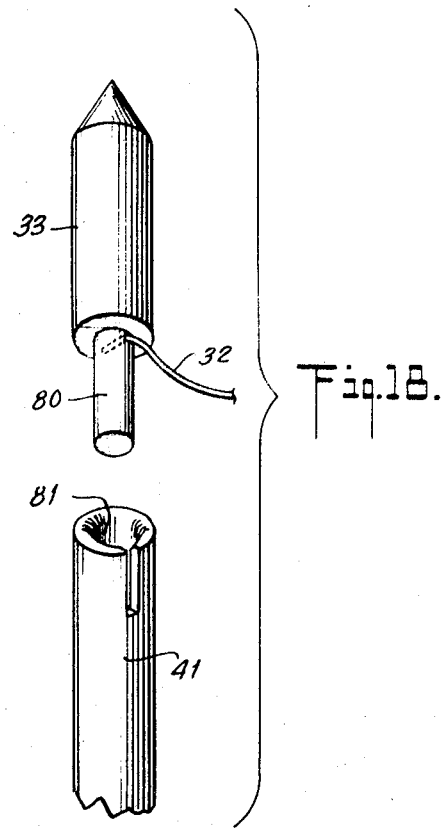
INVENTOR.
ALFRED A. JOHNSON
BY
Robert S. Dunham
ATTORNEY

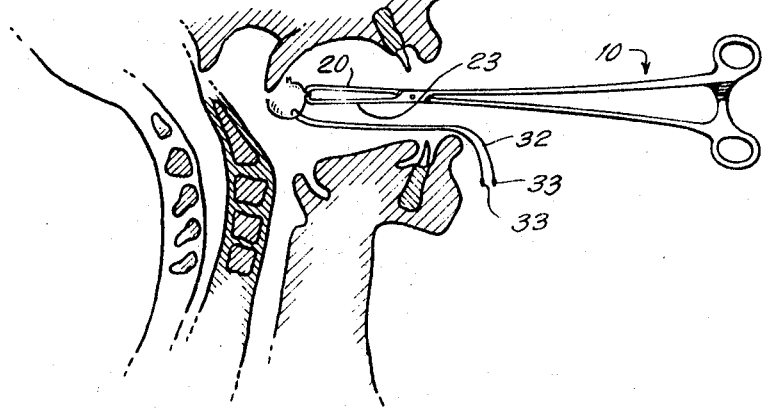
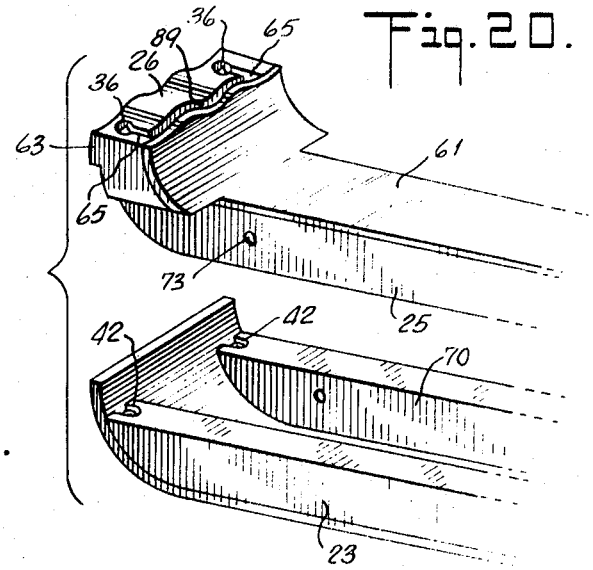
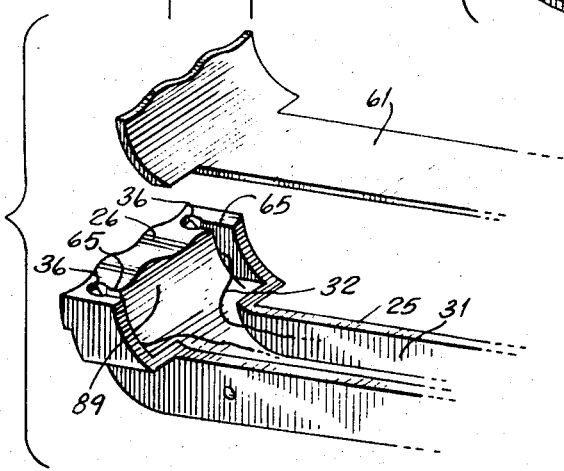

3,470,875
SURGICAL CLAMPING AND SUTURING
INSTRUMENT
Alfred A. Johnson, 155 E. 76th St.,
New York, N.Y. 10021
Filed Oct. 6, 1966, Ser. No. 584,804
Int. Cl. A61b 17/00
U.S. Cl. 128—334     25 Claims

ABSTRACT OF THE DISCLOSURE

A surgical suturing forceps having two pivotally interconnected arms, one or more apertures at the outer end of one of the arms for receiving and gripping a needle, and a capsule containing a suture with one or more needles connected thereto, removably mounted at the outer end of the forceps arm and there holding the needles in such position that upon closing of the forceps, the needles are transferred from the capsule to the receiving apertures, carrying the suture with them. The needle-carrying portion of the capsule and the apertured extremity of the first-mentioned may have facing clamp surfaces, for clamping between them a portion of body tissue to be sutured, and the capsule-carrying forcep arms may contain a plunger that is axially displaced upon closing of the forceps to engage the rearward extremities of the needles within the capsule, forcing the needles through the clamped body tissue and into the needle-receiving apertures.

---

This invention relates to surgical clamping and suturing instruments. More particularly, it is directed to a novel form of instrument for clamping body tissue and applying a suture to the clamped tissue portion, and to a replaceable suture-carrying structure for use with such instrument.

One important illustrative field of application for the present invention is the clamping and surturing of bleeding points or vessels within surgical openings in the body.

The halting of localized bleeding within surgical openings or cavities is a very frequently necessary but nonetheless difficult and time-consuming procedure in present-day surgical practice. When bleeding occurs, as from a small blood vessel within a cavity opened for surgical operation, the bleeding must be arrested by clamping its source, and the bleeding point must then be sutured before the operation can proceed. Ordinarily, a clamp is first applied and precisely located at the bleeding point of the exposed tissue to halt the flow of blood. An elongated arcuate needle having a suture already secured thereto is removed from a sterilized package and grasped in a forceps. The neddle is introduced to the body cavity by means of the forceps and passed through the tissue adjacent to the clamped portion; the point of the needle is then graped with a forceps as it emerges from the tissue, to complete the stitch and to withdraw the needle from the body cavity. This procedure must be repeated for each stitch that is to be made. Since a plurality of forceps manipulations are required in making the stitch, it is often necessary for an assistant as well as the principal operating surgeon to participate in the suturing procedure.

Not only does the above-described procedure occupy considerable time (especially when a plurality of stitches are to be made) and thus undesirably protract the operation, but in addition the positioning and forming of the stitches may be very difficult, especially when the tissue to be sutured is positioned at a deep and relatively inaccessible locality. Furthermore, the suturing steps are attended with hazards in that the needle may break within the cavity or may pierce and damage adjacent tissues unless great care is exercised. Although illustrated by procedures for halting bleeding, the foregoing problems, it may be noted, are not peculiar to the suturing of bleeding vessels but are also encountered in many other surgical situations wherein sutures must be made.

A variety of instruments have heretofore been proposed for use by surgeons in clamping and suturing procedures as described above. Commonly, however, the use of these instruments involves a succession of more or less complex manipulative steps, including the actuation in a prescribed sequence of a plurality of levers, with repositioning of the surgeon's hands or fingers to effect such actuation. Thus, clamping and suturing instruments as heretofore known have afforded only limited advantages in reducing manipulative complexity of suturing operations.

Moreover, the use of these instruments often requires threading of a needle or careful positioning of a needle in the instrument. Whereas the prepackaging of a single suture and attached needle in a sterilized package is convenient and desirable from the standpoint of assured suture and needle sterility, most suturing and clamping instruments heretofore known have not been adapted for use with such prepackaged, needle-bearing single sutures.

An objective of the present invention is to provide a new and improved form of surgical clamping and suturing instrument, adapted both to clamp a portion of body tissue and to apply the suture thereto, in an essentially unitary manipulative procedure conveniently performable with the fingers of one hand.

Another object is to provide such an instrument having sepecial utility for clamping and suturing portions of body tissue within a deep cavity, in a manner involving introducing and manipulation of only a single instrument within the cavity, and with no hazard of needle loss or breakage, or damage to adjacent exposed organs.

A further object is to provide such an instrument wherein the clamping and suturing operations are effectuated successively in a manner requiring only a single manipulation of the instrument, yet enabling disengagement and repositioning of the clamp before the suture is applied to facilitate assured accurate location of the clamp and suture.

Yet another object is to provide such an instrument wherein the suture, bearing an attached needle, is prepackaged in a capsule structure and is positioned in the instrument for application by simple insertion or mounting of the capsule on a portion of the instrument adapted to receive the same, without handling or removal from the capsule of the suture and the needle; and wherein successive sutures can be applied by simply replacing the capsule on the instrument with a new suture-bearing capsule.

Another object is to provide such an instrument adapted to form simultaneously a plurality of stitches with a suture contained in a single capsule.

A further object is to provide a capsule carrying a suture and attached needle, for use in a clamping and suturing instrument, adapted to be mounted on or inserted in such instrument for application of the suture without removal thereof from the capsule.

Yet another object is to provide such a capsule carrying one or more sutures with attached needles arranged to form simultaneously a plurality of stitches.

An additional object is to provide a clamping and suturing forceps adapted to receive a removable capsule containing a suture or sutures secured to one or more needles, and to apply the suture from the capsule.

Further objects and advantages of the invention will be apparent from the detailed description hereinbelow set forth, together with the accompanying drawings, wherein:

FIG. 1 is a plan view of a surgical clamping and suturing forceps embodying the invention in a particular form;

FIG. 2 is a side elevational view of the forceps of FIG. 1;

FIG. 3 is an enlarged detail view of the latch members carried on the forceps handles, in open position, showing an arrangement of elements for actuating the suture-applying means of the forceps upon closing of the forceps;

FIG. 4 is a sectional view of the forceps latch members in open position taken along the line 4—4 of FIG. 3;

FIG. 5 is a view similar to FIG. 4 but showing the latch members in closed position;

FIG. 6 is an enlarged plan view, partly in section, of the handle of one arm of the forceps of FIG. 1, illustrating the disposition of the suture-applying means therein;

FIG. 7 is an enlarged plan view of the jaws of the forceps of FIG. 1;

FIG. 8 is a further enlarged end elevational view of the forceps jaws in open position;

FIG. 9 is a view of the suture capsule-carrying jaw of the forceps of FIG. 1, partly in section, taken as along the line 9—9 of FIG. 7;

FIG. 10 is an enlarged sectional view of the jaw of FIG. 9, taken along the line 10—10 of FIG. 9;

FIG. 11 is a further enlarged perspective view of the jaw of FIG, 9, with the suture-carrying capsule in place;

FIG. 12 is an exploded perspective view similar to FIG. 11 but showing the capsule removed from the jaw;

FIG. 13 is an enlarged cross-sectional view taken along the line 13—13 of FIG. 9;

FIG. 14 is an enlarged sectional view of the outer end of the jaws of the forceps of FIG. 1, showing the jaws as they are brought into position for clamping and suturing a portion of body tissue;

FIG. 15 is a view similar to FIG. 14, showing the jaws in clamping position as the suture-carrying needle is advanced through the tissue;

FIG. 16 is another view similar to FIGS. 14 and 15, showing the jaws as they are reopened for completion of the suturing operation;

FIG. 17 is a simplified perspective view further illustrating the operation of the forceps in applying a succession of sutures;

FIG. 18 is an enlarged view showing details of the structure of the suture-carrying needle and of the suture-applying means of the forceps which engages the needle;

FIG. 19 is a simplified view showing use of the forceps for application of sutures within an oral cavity;

FIG. 20 is an exploded perspective view of the end of the suture-carrying forceps jaw with a modified form of suture-carrying capsule; and FIG. 21 is an exploded perspective view of the capsule of FIG. 20 with the capsule cover removed.

Referring to the drawings, the instrument of the invention is shown as embodied in a forceps 10 comprising a pair of forceps arms 11 and 12 pivotally interconnected in usual manner at an intermediate locality by means of a pivot pin 14. Arms 11 and 12 each have handle portions, respectively designated 16 and 17, extending rearwardly from the pivot pin 14 and terminating in conventionally shaped finger grips respectively designated 18 and 19. Forwardly of the pivot 14, the arm 12 includes a jaw portion 20 which turns inwardly (that is, toward the central axis of the instrument) at its forward extremity to terminate in an inwardly-facing clamp surface 21. Arm 11 includes a jaw portion 23, also extending forwardly from the pivot 14, and adapted to receive a removable suture-carrying capsule 25 which projects inwardly at its forward extremity to terminate in an inwardly facing clamp surface 26 positioned for register with the surface 21 of jaw 20.

As more particularly shown in FIGS. 3–5, the handle portions 16 and 17 of arms 11 and 12 bear transversely extending latch members, respectively designated 28 and 29, which project toward each other from the respective arms in offset relation so as to overlap when the forceps is closed. Opposed arrays of notches 30 are formed on the facing surfaces of latch members 28 and 29, for successive interengagement as the handle portions 16 and 17 are brought together for closing of the jaws 20 and 23, to latch or retain the arms 11 and 12 in any of a range of successively closer positions.

The capsule 25, removably mounted on jaw 23, has a recess 31 adapted to contain a suture 32 (FIG. 9). In the embodiment shown, the suture has a pair of small needles 33 (FIG. 8) secured to its two ends. These needles are carried by the capsule in a pair of side-by-side, parallel, arcuate channels 35, which communicate with a pair of needle discharge openings 36 in the clamp surface 26 and extend therefrom downwardly and somewhat rearwardly through the forward portion of the capsule as seen in FIG. 10, to open at a wall or surface portion of the capsule 25 contiguous to a generally inwardly facing surface of the supporting jaw 23.

A flexible plunger element 38, of wire or the like, extends in a longitudinal channel 39 substantially throughout the entire length of the arm 11 from the latch member 28 to the forward end of jaw 23 and is adapted for forward and rearward axial sliding movement in the channel 39. It will be seen that the channel 39 is curved at various localities, for example adjacent the pivot pin 14; the flexibility of the wire forming the plunger element is such as to enable it to move axially in the manner described within the curved portions of the channel.

Within the jaw 23, the plunger element 38 is bifurcate, comprising a pair of prongs 41 which extend forwardly through the jaw in parallel channels 42 from their junction 43 with the major extent of element 38 to the forward end of the jaw. The forward extremities of prongs 41, in their respective channels 42, curve inwardly and immediately underlie the downward openings of the needle-holding channels 35 of capsule 25, in register with these latter openings; thus upon forward advance of the plunger element, the forward ends of the two prongs 41 move into the channels 35 to engage the needles 33 and push them upwardly through the discharge openings 36. As shown in FIG. 9, the channel 39 is enlarged at its junction with the parallel jaw channels 42 to form a recess 44 for accommodating forward movement of the plunger element junction 43 incident to the described advance of the plunger.

As best seen in FIGS. 11–13, to facilitate the provision of the channels 39 and 42 and the disposition of the plunger element and prongs therein, the channels may be formed initially as grooves on the outer surface of the body of jaw 23 and, after positioning of the plunger element and prongs, may be closed by means of an outer plate 47 welded to the outer surface of the jaw.

At its rearward extent in handle 16, the plunger 38 turns inwardly to project, through a groove 48 in latch member 28, toward the latch member 29 of arm 12, as shown in FIGS. 3–5. The exposed portion of plunger 38 within the latter groove may be shielded by an open-ended hollow guide member 50 mounted within the groove and defining an extension of channel 39. A fixed plunger member 52, dimensioned to be received within the open end of guide 50, is mounted in the latch member 29 of arm 12 within a centrally disposed groove 53, extending transversely toward latch member 28. Guide 50 and plunger member 52 are so disposed that as the arms 11, 12 are closed, bringing the facing notched surfaces of latch members 28 and 29 into engaging relaxation, the plunger member 52 enters guide 50 and engages the rearward extremity of the movable plunger element 38 therein. As illustrated in FIG. 5, further closing movement of arms 11, 12 causes member 52 to depress element 38, advancing the latter element forwardly in its channel 39 in the arm 11 and thereby moving the forward ends of prongs 41 upwardly into the needle-holding channels 35 of capsule 25 for discharging the needles from the latter channels.

Within the the handle portion of arm 11, channel 39 is enlarged to form a recess 56 (FIG. 6) through which the plunger 38 extends, and which has mounted therein, in surrounding relation to the plunger, a helical spring 57 under compression acting between the forward surface of recess 56 and a button 58 carried by the plunger. Spring 57 acts to bias the plunger rearwardly, i.e., toward a position in which the prongs 41 are fully retracted from the channels 35 (this being the position of the prongs shown in FIG. 10), so that upon opening of the forceps and concomitant removal of pressure from the rearward extremity of plunger 38, the spring moves the plunger to the retracted position.

As hereinafter further explained, the fixed plunger 52 and the rearward end of the movable plunger 38 in its retracted position are so disposed, relative to each other, as to permit moderate clamping engagement of the clamp surfaces 21 and 26 upon closing of the forceps, with corresponding engagement of the outer notches 30 of latch members 28 and 29, before fixed plunger 52 engages plunger element 38 to effect forward advance of plunger 38. Actuation of the plunger 38 is therefore effected only upon further closing movement of the arms 11 and 12; to accommodate such further closing movement, without application of undue pressure between the clamping surfaces 21 and 26 desirably the arms 11 and 12 are fabricated of a somewhat flexible metal.

Referring further to the capsule 25, as particularly shown in FIGS. 11–13, this capsule in its illustrated embodiment comprises an elongated and generally rectangular hollow receptacle 60, defining the recess 31 containing the suture 32, and closed by a cover 61 which constitutes the inwardly facing surface of the capsule. The capsule may be formed of metal, or of other material such as a plastic having suitable properties of structural rigidity and thermal stability to permit sterilization. In its assembly the suture may first be positioned within the capsule recess 31, and the cover 61 may then be fixedly secured to the capsule walls in any suitable manner.

Formed integrally with the receptacle 60 and disposed at the forward end thereof is a head portion 63 of the capsule which projects inwardly from the cover 61 and bears the aforementioned inwardly facing clamp surface 26. The two needle-holding channels 35 are formed within the head portion 63, extending as stated from the needle discharge openings 36 in clamp surface 26 downwardly through the head portion to the outer surface thereof for register with the forward extremities of plunger prongs 41 in channels 42 which open in the facing surface of jaw 23. Each of the channels 35 communicates with a groove 65 extending rearwardly through clamp surface 26 from needle discharge opening 36 to and beyond the rear edge of the clamp surface in the head 63. As will be apparent from FIG. 12, the two ends of the suture 32 extend forwardly from the receptacle 60 through an opening 67 in the forward portion of cover 61 and thence through the grooves 65 into the needle channels 35 wherein they are secured to the needles 33. This arrangement of needle-holding channels 35, grooves 65 and suture recess opening 67 is such that as the needles are discharged from the channels 35 through openings 36, the suture is discharged with them through opening 67, without hindrance or obstruction.

The capsule 25 is dimensioned to fit within a recess 70 formed in the forward portion of jaw 23, with the channels 35 in register with the plunger channels 42 and the clamp surface 26 positioned for register with clamp surface 21 of jaw 20 upon closing of the forceps. Desirably, the capsule fits securely within the recess 70 so as to be held fixed in position therein during operation of the instrument, yet is readily removable therefrom for quick replacement by another capsule. As shown, the rearward portion 71 of the capsule may fit within a rearward, undercut portion of recess 70 which retains this extremity of the capsule, while the forward portion of the capsule may bear on its opposed side surfaces a pair of projections 73 adapted to engage corresponding depressions 74 in the side walls of the recess 70. The material of which the capsule is constructed may be sufficiently resilient to enable the capsule to undergo minor deformation as it is introduced to and removed from the recess 70, and to fit snugly within the recess when in position.

The jaw 20, as shown in FIG. 8, bears a pair of needle-receiving apertures 77 opening through the clamp surface 21 of this jaw in register with the needle discharge openings 36 of capsule 25, and extending upwardly therefrom along a generally arcuate path (as illustrated in FIGS. 14–16) which represents a continuation of the arcuate path defined by channels 35. The apertures 77 are dimensioned to receive the needles 33 and may have mounted within them small springs 78 disposed and adapted frictionally to engage the needles 33 upon advance of the needles from channels 35 into apertures 77, so as to hold the needles in the apertures.

To provide a good clamping surface for engaging the body tissue, and also for assured maintained register between the channels 35 and apertures 77, the clamp surfaces 21 and 26 may be corrugated or dentate in configuration; that is, each of these surfaces may be formed with a succession of ridges and depressions adapted to mesh with corresponding depressions and ridges in the other clamp surface and thereby to prevent lateral movement of the two jaws 20 and 23 relative to each other when the jaws are in clamping position.

The needles 33 are formed of metal or other suitably rigid material and are generally cylindrical in shape. They are sufficiently short (e.g., a small fraction of an inch in length) to fit entirely within the channels 35 of capsule 25 and, when advanced by the plunger prongs 41, to move along the arcuate channels and be received within the apertures 77 of jaw 20. The suture ends are secured to these needles in any suitable manner, for example by insertion thereof through small transverse holes in the needles; arrangements for attaching sutures to needles of comparable dimensions are well known in the art and accordingly need not be described in detail. The forward ends of the needles may be formed into points to facilitate piercing of body tissue, while the main shanks of the needles are dimensioned to fit closely within the channels 35, engaging the side walls of the channels so that the needles are normally retained therein by friction but are movable out of the channels by the plunger prongs 41.

As more particularly shown in FIG. 18, each of the needles 33 may have a rearwardly extending projection 80 of reduced diameter, as compared to the needle shank, and the plunger prongs 41 at their forward ends may be provided with longitudinally slotted orifices 81 dimensioned to receive these projections 80. With such arrangement, upon advance of the plunger prongs into the channels 35, the orifices 81 engage the projections 80 of the needles to hold the needles in proper axial alignment for passage from the channels through body tissue into the apertures 77, thereby to prevent lateral displacement of the needless relative to the plunger prong ends as they advance through tissue.

The operation of the present instrument will now be readily apparent. A capsule 25, carrying a suture attached at its ends to a pair of needles 33 disposed within channels 35, is slipped into position in the recess of jaw 23. Conveniently, the suture capsule (which is presterilized) may be prepackaged as a unit, being removed from its package and inserted in the forceps jaw immediately prior to use in the operating room. Also, capsule 25 may be formed of a low-cost material and may simply be discarded upon removal from the instrument after the suture is discharged.

With the casule in place, the forceps, held by the fingers of one hand in grips 18 and 19, is brought into position at the locality of tissue to be clamped, as shown in FIG. 14, in the same manner as a conventional clamping forceps. It is closed (by inward finger pressure on the grips) sufficiently to clamp the tissue firmly between surfaces 21 and 26, but not yet sufficiently to operate the plunger 38 by engagement with fixed plunger 52. The forceps may be secured in this first position by the effectively automatic interengagement of the outer notches 30 on latch members 28 and 29. In this way, before the suture is applied, the surgeon may determine whether the clamp is properly located and, if necessary, may release the clamp by opening the forceps and reposition it prior to making the stitches.

Once the clamp is correctly positioned, the forceps is further closed by continuing inward finger pressure on grips 18 and 19, to bring the fixed plunger 52 into engagement with the end of plunger 38 and thereby advance the plunger prongs 41 into the channels 35 of capsule 25. The advancing plunger prongs engage the rearward projections 80 of needles 33 and advance the needles upwardly through the portion of tissue 84 held between the clamp surfaces, and into the needle-receiving apertures 77 of jaw 20, as shown in FIG. 15. Thereby the ends of suture 32, connected to the needles 33, are drawn through the tissue. The forceps is then reopened, disenaging the end of plunger element 38 from the fixed plunger 52, so that the plunger prongs 41 are retracted under the biasing force of spring 57. The needles 33, however, remain secured in position in the apertures 77, being held there by their frictional engagement with springs 78 in the latter apertures, as the forceps is opened.

Thus, as indicated in FIG. 16, upon further opening of the forceps, releasing the tissue portions 84, the two ends of the suture 32 continue to be drawn upwardly through the tissue, until the entire suture has been discharged from recess 31 through the opening 67 and grooves 65. The forceps may then be drawn up and away from the sutured tissue as shown in FIG. 17, and the two needles 33 removed from the apertures 77 with the hand. The free ends of the suture are thus in convenient position for tying. In this way there is formed, by a single manipulation of the forceps, a complete two-stitch suture 87.

For formation of a plurality of such double stitches, as further illustrated in FIG. 17, the original, empty capsule is removed from the instrument, and the above-described procedure is repeated using a new suture-containing capsule for each double stitch.

While the suturing operation is shown in FIG. 17, for convenience of illustration, as performed on a flat, exposed portion of body tissue, the present instrument affords ready and convenient suturing in deep and relatively inaccessible locations, for example in oral cavities, as illustrated in FIG. 19. Because the needles are at all times enclosed either within the capsules 25 or within the apertures 77 of jaw 20, there is no danger of needle loss or breakage or injury to adjacent body organs, and the needles (remaining attached to the jaw 20) may conveniently be withdrawn from the cavity with the forceps to enable tying and completion of the suture. It will be understood, of course, that the needle-bearing ends are removed by cutting from the completed suture.

A modified form of suture-containing capsule is shown in FIGS. 20 and 21. This structure is generally similar to that already described, except that the forward portion of the capsule cover 61 extends upwardly along the rearward surface of the capsule head 63 and has no suture discharge opening 67. Instead, between the grooves 65 the rear wall of the capsule head 63 is offset forwardly to provide a space or passage 89 (open in the direction facing jaw 20) between such rear wall and cover 61, connecting the two grooves 65 and extending downwardly into the suture-containing recess of the capsule. As indicated in FIG. 21, the two ends of the suture 32 extend from the suture-containing recess forwardly through passage 89 and grooves 65 to the needles 33 in channels 35. Upon transfer of the needles from the capsule to the needle apertures 77 of forceps jaw 20, the suture passes freely from the capsule recess through this continuous path for unobstructed discharge from the capsule.

For purposes of illustration, the instrument of the invention in its foregoing embodiment has been described as arranged to form a double suture stitch with a single closing movement of the forceps. A double stitch of this type is commonly employed to effect suturing of a bleeding point or vessel in a surgical cavity and has heretofore required the successive formation of two stitches, now simultaneously formed by the present instrument. It will be aprpeciated, however, that other capsule arrangements may be provided, including either a single needle attached to one end of the suture for making a single stitch, or a plurality of needles larger than two, each carried in a separate needle-holding channel 35 and each connected to a separate suture end. In the latter case, all the needle-holding channels communicate with rearwardly opening grooves 65 in the clamping surface 26 positioned and adapted to enable a suture contained in the capsule recess and having ends secured to all these needles, to be discharged therewith for formation of a multiple-stitch suture; and the plunger 38 at its forward end has a plurality of prongs 41 corresponding to the number of needles, disposed to enter the several needle channels for transfer of the needles to individual apertures 77 in jaw 20 upon closing of the forceps.

It is to be understood that the invention is not limited to the features and embodiments hereinabove set forth, but may be carried out in other ways without departure from its spirit.

I claim:
1. In a surgical clamp and suture instrument, in combination,
   (a) a forceps comprising a pair of pivotally interconnected arms each having a jaw and a handle, the jaw of one of said arms bearing a first clamp surface with a needle-receiving aperture therein;
   (b) a suture-carrying capsule removably mounted on the jaw of the other of said arms and having body portions forming a recess for holding a suture with an opening for discharge thereof, a second clamp surface positioned for register with said first clamp surface, and a needle-holding channel extending from a needle discharge opening in said second clamp surface to a second opening in a surface portion of said capsule, said discharge opening being positioned for register with said aperture, and said channel and recess being mutually disposed and arranged to receive, respectively, a needle and a suture secured thereto, and upon discharge of said needle through said discharge opening to permit discharge of the suture therewith through said recess opening; and
   (c) means for transferring a needle from said channel to said aperture, including a plunger element carried in said other arm and movable endwise, by closing of said forceps, into said channel through said second opening to engage and advance the needle through said discharge opening into said aperture, said aperture being adapted to retain the needle upon reopening of the forceps.

2. An instrument as defined in claim 1, wherein said plunger element is a flexible member extending rearwardly along said other arm from the locality of said channel and terminating rearwardly in a portion projecting transversely from said other arm for engagement by a portion of said one arm upon closure of said forceps to effect said endwise movement of said plunger element into said channel.

3. An instrument as defined in claim 2, including means carried by said other arm for biasing said plunger element rearwardly away from said channel.

4. An instrument as defined in claim 3, wherein said plunger-engaging portion of said one arm comprises a transversely projecting element carried by said one arm and positioned, relative to a rearwardly biased position of said transversely projecting portion of said plunger element, to effect said endwise movement of said plunger element only upon closure of said forceps substantially further than necessary to effect clamping engagement of said clamping surfaces, said forceps arms being sufficiently flexible to permit said further closure thereof.

5. An instrument as defined in claim 1, wherein each of said clamp surfaces is of dentate form bearing depressions and projections disposed to mesh with corresponding projects and depressions on the other of said clamp surfaces.

6. An instrument as defined in claim 1, including means carried by said jaw of said one arm for retaining a needle in said needle-receiving aperture upon transfer of the needle from said channel to said aperture.

7. An instrument as defined in claim 1, wherein the forward end of said plunger element has an axial orifice dimensioned to receive a reduced-diameter rearward projection on a needle in said channel for maintaining axial alignment of said needle during transfer thereof from said channel to said needle-receiving aperture by said plunger element.

8. An instrument as defined in claim 1, wherein said jaw of said other arm has a recess for receiving said capsule to mount said capsule removably in said last-mentioned jaw.

9. An instrument as defined in claim 1, wherein said suture-carrying capsule has at least two needle-holding channels extending in spaced parallel relation from a pair of needle discharge openings in said second clamp surface to a pair of second openings in said surface portion of said capsule, said needle-holding channels and said recess being mutually disposed and arranged to receive, respectively, a needle in each of said channels and a suture in said recess having ends connected to each of said needles, and upon discharge of said needles through said discharge openings to permit discharge of the suture therewith through said recess opening; wherein said jaw of said one arm has a plurality of needle-receiving apertures corresponding in number to said needle-holding channels and positioned for register therewith in said first clamp surface; and wherein said plunger element comprises a plurality of prongs, corresponding in number to said needle-holding channels, and respectively extending forwardly along said jaw of said other arm into register with said second openings of said needle-holding channels, said prongs being movable endwise, by closing of said forceps, into said channels through said second openings thereof to engage and advance the needles contained in said channels through said discharge openings into said needle-receiving apertures, said apertures being adapted to retain said needles on reopening of the forceps.

10. An instrument as defined in claim 9, wherein said capsule has grooves communicating with and extending from each of said needle-holding channels through said second clamp surface toward said recess opening, said grooves and recess opening being mutually disposed and arranged to permit discharge of said suture with said needles from said capsule.

11. In a surgical clamp and suture instrument, in combination, (a) a forceps comprising a pair of pivotally interconnected arms each having a jaw and a handle, the jaw of one of said arms bearing a first clamp surface with a pair of needle-receiving apertures in side-by-side spaced relation therein;

(b) a suture-carrying capusle removably mounted on the jaw of the other of said arms, comprising a body portion forming a recess for holding a suture with an inwardly directed opening for discharge thereof and a head portion formed integrally with said body portion and extending inwardly therefrom at the forward end of said body portion, said head portion bearing a second clamp surface positioned for register with said first clamp surface, and having a pair of needle-holding channels extending in spaced parallel relation from a pair of needle discharge openings positioned in said second clamp surface for register with said apertures to a pair of second openings in a surface portion of said capsule, said head portion further having a pair of grooves respectively communicating with said needle discharge openings and extending rearwardly therefrom through said second clamp surface toward said recess opening;

(c) a suture disposed in said recess and having two opposed ends respectively extending forwardly through said recess opening and said grooves into said needle-holding channels;

(d) a pair of needles, respectively disposed in said needle-holding channels and respectively secured to said opposed ends of said suture therein;

(e) a plunger element extending through a longitudinal channel in said other arm, and axially movable in said channel, said plunger element having a forward portion comprising a pair of flexible prongs respectively extending through a bifurcate portion of said longitudinal channel in said jaw of said other arm into register with said second openings of said needle-holding channels, and said plunger element further having at its rearward extremity a portion projecting transversely from said other arm toward said one arm;

(f) means carried by said other arm for biasing said plunger element rearwardly away from said needle-holding channels;

(g) a transversely projecting element carried by said one arm and disposed to engage said transversely projecting portion of said plunger element upon closure of said forceps to advance said prongs endwise into said needle-holding channels through said second openings thereof for engaging and advancing said needles through said discharge openings into said needle-receiving apertures, said transversely projecting element being positioned, relative to a rearwardly biased position of said plunger element, to effect endwise movement of said prongs only upon closure of said forceps substantially further than necessary to effect clamping engagement of said first and second clamping surfaces; and (h) means mounted in said needle-receiving apertures for frictionally engaging said needles to retain said needles in said apertures upon transfer of said needles thereto from said needle-holding channels.

12. An instrument as defined in claim 11, wherein each of said needles bears a rearwardly extending projection of reduced diameter and wherein the forward ends of said prongs have axial orifices dimensioned to receive said projections of said needles.

13. Suture-carrying structure comprising a capsule adapted to be removably mounted on one jaw of a forceps, said capsule having body portions forming a recess for holding a suture with an opening for discharge thereof, a clamp surface positioned for register with a corresponding clamp surface on another jaw of said forceps when said capsule is mounted on said one jaw, and a needle-holding channel extending from a needle discharge opening in said first-mentioned clamp surface to a second opening in a surface portion of said capsule and shaped to permit discharge of a needle from said channel through said discharge opening by application of mechanical pressure to the needle through said second opening, said channel and recess being mutually disposed and adapted to receive, respectively, a needle and a suture secured thereto, and upon discharge of said needle through said discharge opening to permit discharge of the suture therewith through said recess opening.

14. A structure as defined in claim 13, wherein said capsule has a raised portion disposed forwardly of said recess opening and bearing said first-mentioned clamp surface, said needle-holding channel extending through said raised portion, and said raised portion having a groove communicating with said needle-holding channel and extending rearwardly therefrom through said first-mentioned clamp surface for receiving a portion of a suture extending between said recess opening and said needle-holding channel.

15. A structure as defined in claim 13, wherein said capsule has a plurality of needle-holding channels extending in parallel relation from needle discharge openings in said first-mentioned clamp surface to second openings in a surface portion of said capsule, said channels and recess being mutually disposed and adapted to receive, respectively, a needle in each of said channels and a suture in said recess having ends secured to each of said needles, and upon discharge of said needles through said discharge openings to permit discharge of the suture therewith through said recess opening.

16. Suture-carrying structure comprising a suture, a pair of needles, and a capsule adapted to be removably mounted on one jaw of a forceps, said capsule having a recess for holding said suture with an opening for discharge thereof, a raised clamp surface disposed forwardly of said recess in position for register with a corresponding clamp surface on another jaw of said forceps when said capsule is mounted on said one jaw, a pair of open-ended needle-holding channels extending from said first-mentioned clamp surface to a surface portion of said capsule, and a pair of grooves in said clamp surface respectively extending from said pair of channels to the readward edge of said clamp surface, said suture being disposed in said recess with end portions extending through said recess opening and said grooves to said channels, said needles being respectively secured to said suture end portions and disposed in said channels for discharge therefrom toward said corresponding clamp surface, and said grooves and recess opening being mutually positioned and adapted to permit unobstructed discharge of said suture with said needles from said capsule.

17. A forceps comprising:
(a) a pair of pivotally interconnected arms each having a jaw and a handle, the jaw of one of said arms bearing a first clamp surface with a needle-receiving aperture therein, the jaw of the other of said arms being adapted to receive and support in fixed position a suture-carrying capsule containing a suture and a needle connected to the suture, wherein said needle is disposed in a channel in position for transfer from said channel to said aperture; and
(b) means for transferring the needle from the capsule channel to said aperture, including a plunger element carried in said other arm and movable endwise, by closing of said forceps, into said channel to engage and advance the needle therefrom into said aperture, said aperture being adapted to retain the needle upon reopening of the forceps.

18. A forceps comprising:
(a) a pair of pivotally interconnected arms each having a jaw and a handle, the jaw of one of said arms bearing a first clamp surface with a pair of needle-receiving apertures therein, the jaw of the other of said arms being adapted to receive and support in fixed position a suture-carrying capsule containing a suture and a pair of needles respectively connected to opposite ends of the suture, wherein said needles are respectively disposed in a pair of spaced needle-holding channels in position for transfer from said channels to said apertures, said apertures being disposed for register with said two needle-holding channels of the capsule;
(b) means for transferring the needles from the capsule channels to said apertures, including a plunger element carried in said other arm and movable endwise, by closing of said forceps, into said channels to engage and advance the needles therefrom into said apertures, said plunger element extending through and being axially movable within a longitudinal channel of said other arm, the forward portion of said plunger element comprising a pair of prongs extending forwardly through said jaw of said other arm for register with said pair of spaced needle-holding channels in said capsule, said prongs being movable endwise into said channels, said plunger element further having at its rearward extremity a portion projecting from said other arm for engagement by said one arm to effect endwise movement of said prongs into said channels upon closure of said forceps;
(c) means carried by said other arm for biasing said plunger element rearwardly away from said channels; and
(d) means carried by said jaw of said one arm for engaging needles received in said apertures to retain the needles in said apertures.

19. In a surgical clamp and suture instrument, in combination,
(a) a forceps comprising a pair of pivotally interconnected jaws, one of said jaws bearing a first clamp surface with a needle-receiving aperture therein;
(b) a suture-carrying capsule removably mounted on the other of said jaws and having body portions forming a recess for holding a suture with an opening for discharge thereof, a second clamp surface positioned for register with said first clamp surface, and a needle-holding channel extending from a needle discharge opening in said second clamp surface to a second opening in a surface portion of said capsule, said discharge opening being positioned for register with said aperture, and said channel and recess being mutually disposed and arranged to receive, respectively, a needle and a suture secured thereto, and upon discharge of said needle through said discharge opening to permit discharge of the suture therewith through said recess opening; and
(c) means for transferring a needle from said channel to said aperture, including a plunger element carried in said other jaw and movable endwise, by closing of said forceps, into said channel through said second opening to engage and advance the needle through said discharge opening into said aperture, said aperture being adapted to retain the needle upon reopening of the forceps.

20. An instrument as defined in claim 19, wherein said suture-carrying capsule has a least two needle-holding channels extending in spaced parallel relation from a pair of needle discharge openings in said second clamp surface to a pair of second openings in said surface portion of said capsule, said needle-holding channels and said recess being mutually disposed and arranged to receive, respectively, a needle in each of said channels and a suture in said recess having ends connected to each of said needles, and upon discharge of said needles through said discharge openings to permit discharge of the suture therewith through said recess opening; wherein said one jaw has a plurality of needle-receiving apertures corresponding in number to said needle-holding channels and positioned for register therewith in said first clamp surface; and wherein said plunger element comprises a plurality of prongs, corresponding in number to said needle-holding channels, and respectively extending forwardly along said other jaw into register with said second openings of said needle-holding channels, said prongs being movable endwise, by closing of said forceps, into said channels through said second openings thereof to engage and advance the needles contained in said channels through said discharge openings into said needle-receiving apertures, said apertures being adapted to retain said needles on reopening of the forceps.

21. In a surgical suturing instrument, in combination,
(a) a forceps comprising a pair of pivotally interconnected jaws, one of said jaws having at its outer end a portion, defining a needle-receiving aperture, for gripping and retaining a needle inserted in said aperture;

(b) a suture;
(c) a needle secured to said suture; and
(d) a capsule removably mounted on the other of said jaws and having a rearwardly extending body portion forming a recess holding said suture with an opening for discharge thereof, and a forwardly extending head portion having a surface positioned for register with said aperture-defining jaw portion, said head portion further having a needle-holding channel opening through said head portion surface in position for register with said aperture, said channel holding said needle in position extending toward said aperture to permit transfer of said needle to said aperture upon closing of said forceps, said channel and recess being mutually disposed and arranged so that said suture extends through said recess opening to said needle in said channel and so that upon transfer of said needle from said channel to said aperture said suture is discharged therewith from said recess through said recess openings.

22. In a surgical suturing instrument, in combination,
(a) a forceps comprising a pair of pivotally interconnected jaws, one of said jaws having at its outer end a portion, defining a pair of needle-receiving apertures disposed in spaced side-by-side relation, for gripping and retaining a pair of needles respectively inserted in said apertures;
(b) a suture having two ends;
(c) a pair of needles respectively secured to said two ends of said suture; and
(d) a capsule removably mounted on the other of said jaws and having a rearwardly extending body portion forming a recess holding said suture with an opening for discharge thereof, and a forwardly extending head portion having a surface positioned for register with said aperture-defining jaw portion, said head portion further having a pair of spaced side-by-side parallel needle-holding channels opening through said head portion surface in position for register with said pair of apertures, said channels respectively holding said needles in position extending toward said apertures to permit transfer of said needles to said apertures upon closing of said forceps, said channels and recess being mutually disposed and arraigned so that said suture ends extend through said recess opening to said needles in said channels and so that upon transfer of said needles from said channels to said apertures said suture is discharged therewith from said recess through said recess opening.

23. Suture-carrying structure comprising:
(a) a suture;
(b) a needle secured to said suture; and
(c) a capsule adapted to be removably mounted on one jaw of a forceps, said capsule having rearwardly extending body portion forming a recess holding said suture with an opening for discharge thereof, and a forwardly extending head portion having a surface positioned for register with a surface of another jaw of said forceps when said capsule is mounted on said one jaw, said head portion further having a needle-holding channel opening through said head portion surface in position for register with a needle-receiving aperture in the last-mentioned surface of the other forceps jaw, said channel holding said needle in such position that said needle extends toward said aperture when said capsule is mounted on said one jaw, to permit transfer of said needle to said aperture upon closing of said forceps, said channel and recess being mutually disposed and arranged so that said suture extends through said recess opening to said needle in said channel and so that upon transfer of said needle from said channel to said aperture said suture is discharged therewith from said recess through said recess opening.

24. Suture-carrying structure comprising:
(a) a suture having two free ends;
(b) a pair of needles respectively secured to said suture ends; and
(c) a capsule adapted to be removably mounted on one jaw of a forceps, said capsule having a rearwardly extending body portion forming a recess holding said suture with an opening for discharge thereof, and a forwardly extending head portion having a surface position for register with a surface of another jaw of said forceps when said capsule is mounted on said one jaw, said head portion further having a pair of spaced side-by-side parallel needle-holding channels opening through said head portion surface in position for register with a pair of needle-receiving apertures in the last-mentioned surface of the other forceps jaw, said channels holding said needles in such position that said needles extend toward said apertures when said capsule is mounted on said one jaw, to permit transfer of said needles to said apertures upon closing of said forceps, said channels and recess being mutually disposed and arranged so that said suture ends extend through said recess opening to said needles in said channels and so that upon transfer of said needles from said channels to said apertures said suture is discharged therewith from said recess through said recess opening.

25. A forceps comprising a pair of pivotally interconnected jaws, one of said jaws having at its outer end a portion, defining a pair of needle-receiving apertures disposed in spaced side-by-side relation, for gripping and retaining a pair of needles respectively in said apertures, and the other of said jaws having at its outer end a recess for receiving and holding in fixed position a suture-carrying capsule containing a suture having two ends and a pair of needles respectively secured to the two suture ends, wherein said needles are disposed in side-by-side spaced parallel channels of said capsule in position for transfer from said channels to said apertures upon closure of said forceps, said capsule being slidable into and out of said fixed position in said jaw recess.

References Cited

UNITED STATES PATENTS

| | | | |
|---|---|---|---|
| 652,175 | 6/1900 | Felson. | |
| 1,009,065 | 11/1911 | Hahn et. al. | 128—340 |
| 1,037,864 | 9/1912 | Carlson et al. | 128—340 |
| 1,449,087 | 3/1923 | Bugbee | 128—340 |
| 2,434,133 | 1/1948 | Volk | 112—169 |
| 3,349,772 | 10/1967 | Rygg | 128—340 |

OTHER REFERENCES

Surgery, vol. 36, #4, p. 791.

DALTON L. TRULUCK, Primary Examiner

U.S. Cl. X.R.

128—340